United States Patent
Carstens

(10) Patent No.: US 8,099,794 B2
(45) Date of Patent: *Jan. 24, 2012

(54) BODY CONFORMING TEXTILE HOLDER FOR ELECTRONIC DEVICE

(75) Inventor: Jerry Edward Carstens, West Chester, OH (US)

(73) Assignee: Rusl, LLC, West Chester, OH (US)

( * ) Notice: Subject to any disclaimer, the term of this patent is extended or adjusted under 35 U.S.C. 154(b) by 1171 days.

This patent is subject to a terminal disclaimer.

(21) Appl. No.: 11/311,774

(22) Filed: Dec. 19, 2005

(65) Prior Publication Data

US 2007/0139875 A1    Jun. 21, 2007

(51) Int. Cl.
    *A41D 13/08*    (2006.01)
(52) U.S. Cl. ............... 2/16; 2/311; 2/312; 2/171; 2/247; 2/69
(58) Field of Classification Search ................ 2/16, 311, 2/247, 69; 381/333
    See application file for complete search history.

(56) References Cited

U.S. PATENT DOCUMENTS

| | | | |
|---|---|---|---|
| 2,573,791 A | 11/1951 | Howells | |
| 2,792,698 A | 5/1957 | Hampp | |
| 2,837,095 A | 6/1958 | Stevenson | |
| 2,946,211 A | 7/1960 | Morancy | |
| 3,098,369 A | 7/1963 | Burleson et al. | |
| 3,299,890 A | 1/1967 | Parker | |
| 3,307,546 A | 3/1967 | Vittoria et al. | |
| 3,368,563 A | 2/1968 | Scheier | |
| 3,504,672 A | 4/1970 | Moon | |
| 3,513,668 A | 5/1970 | Mintz | |
| 3,552,154 A | 1/1971 | Lesley | |
| 3,578,546 A | 5/1971 | Morancy | |
| 3,900,035 A | 8/1975 | Welch et al. | |
| 3,910,075 A | 10/1975 | Holliday | |
| 3,943,912 A | 3/1976 | Nakayama | |
| 3,950,789 A | 4/1976 | Konz et al. | |
| 4,005,494 A | 2/1977 | Burn | |
| 4,014,047 A | 3/1977 | Zobel | |
| 4,038,699 A | 8/1977 | Burn | |
| 4,135,653 A * | 1/1979 | Sieloff ........................ 224/222 |
| 4,190,054 A | 2/1980 | Brennan | |
| 4,195,629 A | 4/1980 | Halford | |
| 4,204,543 A | 5/1980 | Henderson | |
| 4,207,885 A | 6/1980 | Hampton et al. | |
| 4,231,356 A | 11/1980 | Usukura | |

(Continued)

OTHER PUBLICATIONS

Labels on package for product: Therma Care™ Heatwraps (Back/Hip), Procter & Gamble, marketed prior to Nov. 2004.

(Continued)

*Primary Examiner* — Khoa Huynh
*Assistant Examiner* — Alissa Tompkins
(74) *Attorney, Agent, or Firm* — Hasse & Nesbitt LLC; Donald E. Hasse

(57) ABSTRACT

A body conforming, reusable, washable, textile holder for removably holding at least one electronic device in close bodily contact. The holder may be a wrap or tube constructed to enclose a portion of the body where the electronic device is to be held. The electronic device may be a cellular telephone, a wireless communication device, a personal audio device, a wearable computer, an electronic monitoring device, an electronic identification card, or other electronic device. The invention also relates to a system comprising the body conforming holder and an electronic device for use therewith, and a method for holding such an electronic device in close bodily contact by wearing the holder.

24 Claims, 6 Drawing Sheets

U.S. PATENT DOCUMENTS

| | | | |
|---|---|---|---|
| 4,289,137 A | 9/1981 | Dell et al. | |
| 4,300,240 A | 11/1981 | Edwards | |
| 4,326,533 A | 4/1982 | Henderson | |
| 4,366,804 A | 1/1983 | Abe | |
| 4,432,477 A * | 2/1984 | Haidt et al. | 224/222 |
| 4,445,233 A | 5/1984 | Rubin | |
| 4,470,417 A | 9/1984 | Gruber | |
| 4,498,200 A | 2/1985 | Livingstone | |
| 4,500,019 A * | 2/1985 | Curley, Jr. | 224/222 |
| 4,509,667 A * | 4/1985 | Meldrum | 224/250 |
| 4,520,509 A | 6/1985 | Ward | |
| 4,522,190 A | 6/1985 | Kuhn et al. | |
| 4,527,403 A | 7/1985 | Fullbright et al. | |
| 4,527,566 A | 7/1985 | Abare | |
| 4,539,700 A | 9/1985 | Sato | |
| RE32,026 E | 11/1985 | Yamashita et al. | |
| 4,556,055 A | 12/1985 | Bonner, Jr. | |
| 4,563,184 A | 1/1986 | Korol | |
| 4,573,447 A | 3/1986 | Thrash et al. | |
| 4,576,169 A | 3/1986 | Williams | |
| 4,586,506 A | 5/1986 | Nangle | |
| 4,641,379 A | 2/1987 | Martin | |
| 4,649,895 A | 3/1987 | Yasuki et al. | |
| 4,671,267 A | 6/1987 | Stout | |
| 4,676,247 A | 6/1987 | Van Cleve | |
| 4,688,572 A | 8/1987 | Hubbard et al. | |
| 4,753,241 A | 6/1988 | Brannigan et al. | |
| 4,777,073 A | 10/1988 | Sheth | |
| 4,802,473 A | 2/1989 | Hubbard et al. | |
| 4,825,471 A | 5/1989 | Jennings | |
| 4,825,474 A | 5/1989 | Edwards | |
| 4,860,748 A | 8/1989 | Chiurco et al. | |
| 4,876,724 A | 10/1989 | Suzuki | |
| 4,886,063 A | 12/1989 | Crews | |
| 4,891,501 A | 1/1990 | Lipton | |
| 4,935,287 A | 6/1990 | Johnson et al. | |
| 4,949,401 A | 8/1990 | Kimsey | |
| 4,950,264 A | 8/1990 | Osborn, III | |
| 4,961,235 A | 10/1990 | Williger | |
| 4,972,832 A | 11/1990 | Trapini et al. | |
| 4,974,762 A | 12/1990 | Boretsky et al. | |
| 4,981,135 A | 1/1991 | Hardy | |
| 4,990,147 A | 2/1991 | Freeland | |
| 5,000,176 A | 3/1991 | Daniel | |
| 5,005,374 A | 4/1991 | Spitler | |
| 5,009,653 A | 4/1991 | Osborn, III | |
| 5,020,711 A | 6/1991 | Kelley | |
| 5,035,006 A | 7/1991 | Hetz et al. | |
| 5,038,779 A | 8/1991 | Barry et al. | |
| 5,046,479 A | 9/1991 | Usui | |
| 5,062,414 A | 11/1991 | Grim | |
| 5,072,598 A | 12/1991 | Dibrell | |
| 5,088,549 A | 2/1992 | Schneider | |
| 5,107,547 A | 4/1992 | Scheu | |
| 5,144,694 A | 9/1992 | Da oud et al. | |
| 5,146,625 A | 9/1992 | Steele et al. | |
| 5,148,804 A | 9/1992 | Hill et al. | |
| 5,179,942 A | 1/1993 | Drulias et al. | |
| 5,188,103 A | 2/1993 | Smith | |
| 5,207,663 A | 5/1993 | McQueen | |
| 5,214,804 A | 6/1993 | Carey et al. | |
| 5,215,080 A | 6/1993 | Thomas et al. | |
| 5,221,031 A | 6/1993 | Prigmore | |
| 5,230,333 A | 7/1993 | Yates et al. | |
| 5,235,560 A | 8/1993 | Seager | |
| 5,235,561 A | 8/1993 | Seager | |
| 5,239,521 A | 8/1993 | Blonder | |
| 5,260,915 A | 11/1993 | Houlihan | |
| 5,274,850 A | 1/1994 | Aldridge | |
| 5,295,949 A | 3/1994 | Hathaway | |
| 5,305,470 A | 4/1994 | McKay | |
| 5,305,471 A | 4/1994 | Steele et al. | |
| 5,322,061 A | 6/1994 | Brunson | |
| 5,366,492 A | 11/1994 | Ueki | |
| 5,378,225 A | 1/1995 | Chatman et al. | |
| 5,383,869 A | 1/1995 | Osborn, III | |
| 5,395,399 A | 3/1995 | Rosenwald | |
| 5,395,400 A | 3/1995 | Stafford et al. | |
| 5,398,667 A | 3/1995 | Witt | |
| 5,410,762 A | 5/1995 | Maskovich | |
| 5,415,650 A | 5/1995 | Sigl | |
| 5,416,310 A | 5/1995 | Little | |
| 5,450,596 A | 9/1995 | Felsenstein | |
| 5,484,366 A | 1/1996 | Wilkinson | |
| 5,484,448 A | 1/1996 | Steele et al. | |
| 5,484,983 A | 1/1996 | Roell | |
| 5,496,357 A | 3/1996 | Jensen et al. | |
| 5,496,358 A | 3/1996 | Rosenwal.d | |
| 5,503,908 A | 4/1996 | Faass | |
| 5,509,147 A | 4/1996 | Busquets | |
| 5,514,861 A | 5/1996 | Swartz et al. | |
| 5,534,021 A | 7/1996 | Dvoretzky et al. | |
| 5,540,976 A | 7/1996 | Shawver et al. | |
| 5,553,608 A | 9/1996 | Reese et al. | |
| 5,555,490 A | 9/1996 | Carroll | |
| 5,562,648 A | 10/1996 | Peterson | |
| 5,575,786 A | 11/1996 | Osborn, III | |
| 5,605,144 A | 2/1997 | Simmons et al. | |
| 5,613,495 A | 3/1997 | Mills et al. | |
| 5,615,179 A | 3/1997 | Yamamoto et al. | |
| 5,628,308 A | 5/1997 | Harges, Jr. et al. | |
| 5,671,615 A | 9/1997 | Kjaergaard et al. | |
| 5,674,216 A | 10/1997 | Buell et al. | |
| 5,674,270 A | 10/1997 | Viltro et al. | |
| 5,687,587 A | 11/1997 | Michel | |
| 5,690,627 A | 11/1997 | Clear et al. | |
| 5,699,791 A | 12/1997 | Sukienniki et al. | |
| 5,717,991 A | 2/1998 | Nozaki et al. | |
| 5,721,783 A | 2/1998 | Anderson | |
| 5,728,058 A | 3/1998 | Ouellette et al. | |
| 5,728,146 A | 3/1998 | Burkett et al. | |
| 5,735,807 A | 4/1998 | Cropper | |
| 5,735,889 A | 4/1998 | Burkett et al. | |
| 5,741,318 A | 4/1998 | Ouellette et al. | |
| 5,766,235 A | 6/1998 | Kostopoulos | |
| 5,774,338 A | 6/1998 | Wessling, III | |
| 5,782,819 A | 7/1998 | Tanzer et al. | |
| 5,798,907 A | 8/1998 | Janik | |
| 5,807,267 A | 9/1998 | Bryars et al. | |
| 5,817,584 A | 10/1998 | Singer et al. | |
| 5,844,824 A | 12/1998 | Newman et al. | |
| 5,845,340 A | 12/1998 | Frislie | |
| 5,860,945 A | 1/1999 | Cramer et al. | |
| 5,890,636 A | 4/1999 | Kibbe | |
| 5,904,710 A | 5/1999 | Davis et al. | |
| 5,906,637 A | 5/1999 | Davis et al. | |
| 5,918,590 A | 7/1999 | Burkett et al. | |
| 5,925,072 A | 7/1999 | Cramer et al. | |
| 5,928,275 A | 7/1999 | Yates et al. | |
| 5,934,275 A | 8/1999 | Gazzara | |
| 5,938,089 A | 8/1999 | Abreu-Marston | |
| 5,960,366 A | 9/1999 | Duwaer | |
| 5,980,562 A | 11/1999 | Ouellette et al. | |
| 5,994,612 A | 11/1999 | Watkins | |
| 6,019,782 A | 2/2000 | Davis et al. | |
| 6,020,040 A | 2/2000 | Cramer et al. | |
| 6,048,326 A | 4/2000 | Davis et al. | |
| 6,074,413 A | 6/2000 | Davis et al. | |
| 6,080,690 A | 6/2000 | Lebby et al. | |
| 6,096,067 A | 8/2000 | Cramer et al. | |
| 6,102,937 A | 8/2000 | Cramer et al. | |
| 6,109,496 A | 8/2000 | Andrew et al. | |
| 6,120,485 A | 9/2000 | Gustafsson et al. | |
| 6,123,717 A | 9/2000 | Davis et al. | |
| 6,137,675 A | 10/2000 | Perkins | |
| 6,146,732 A | 11/2000 | Davis et al. | |
| 6,148,817 A | 11/2000 | Bryant et al. | |
| 6,183,458 B1 | 2/2001 | Ahlstrand et al. | |
| 6,186,969 B1 | 2/2001 | Bell et al. | |
| 6,189,149 B1 | 2/2001 | Allen | |
| 6,192,253 B1 | 2/2001 | Charlier et al. | |
| 6,208,876 B1 | 3/2001 | Raussi et al. | |
| 6,212,414 B1 | 4/2001 | Alameh et al. | |
| 6,272,359 B1 | 8/2001 | Kivela et al. | |
| 6,324,053 B1 | 11/2001 | Kamijo | |
| 6,336,935 B1 | 1/2002 | Davis et al. | |
| 6,338,340 B1 | 1/2002 | Finch et al. | |

| | | |
|---|---|---|
| 6,340,472 B1 | 1/2002 | Zhang et al. |
| 6,345,751 B1 | 2/2002 | Elliot |
| 6,346,097 B1 | 2/2002 | Blaney |
| 6,367,088 B1 | 4/2002 | Bergemann |
| 6,375,646 B1 | 4/2002 | Widlund et al. |
| 6,393,621 B1 | 5/2002 | Redwine et al. |
| 6,436,020 B1 | 8/2002 | Weingand |
| 6,440,159 B1 | 8/2002 | Edwards et al. |
| 6,465,006 B1 | 10/2002 | Zhang et al. |
| 6,477,117 B1 | 11/2002 | Narayanaswami et al. |
| 6,488,959 B2 | 12/2002 | Stanley et al. |
| 6,507,486 B2 | 1/2003 | Peterson, III |
| 6,516,289 B2 | 2/2003 | David |
| 6,535,461 B1 | 3/2003 | Karhu |
| 6,535,605 B1 | 3/2003 | Ghassabian |
| 6,546,281 B1 | 4/2003 | Zhang et al. |
| 6,561,814 B2 | 5/2003 | Tilbury et al. |
| 6,567,523 B1 | 5/2003 | Ghassabian |
| 6,570,053 B2 | 5/2003 | Roe et al. |
| 6,584,976 B2 | 7/2003 | Japuntich et al. |
| 6,594,370 B1 | 7/2003 | Anderson |
| 6,605,071 B1 | 8/2003 | Gray et al. |
| 6,613,350 B1 | 9/2003 | Zhang et al. |
| 6,615,838 B1 | 9/2003 | Tsai |
| 6,616,649 B1 | 9/2003 | Ismail |
| 6,632,212 B1 | 10/2003 | Morman et al. |
| 6,644,314 B1 | 11/2003 | Eisberg |
| 6,656,210 B1 | 12/2003 | Plewes |
| 6,698,636 B2 | 3/2004 | Angus et al. |
| 6,702,801 B2 | 3/2004 | VanGompel et al. |
| 6,713,660 B1 | 3/2004 | Roe et al. |
| 6,726,668 B2 | 4/2004 | Underhill et al. |
| 6,726,673 B1 | 4/2004 | Zhang et al. |
| 6,770,064 B1 | 8/2004 | Ruscher |
| 6,780,426 B2 | 8/2004 | Zhang et al. |
| 6,792,124 B2 | 9/2004 | Tilbury et al. |
| 6,801,140 B2 | 10/2004 | Mantyjarvi et al. |
| 6,801,476 B2 | 10/2004 | Gilmour |
| 6,826,782 B2 | 12/2004 | Jordan |
| 6,850,773 B1 | 2/2005 | Ghassabian |
| 6,885,876 B2 | 4/2005 | Aaltonen et al. |
| 6,893,453 B2 | 5/2005 | Agarwal et al. |
| 6,899,257 B2 | 5/2005 | Jones |
| 6,905,073 B2 | 6/2005 | Gerrits et al. |
| 6,928,657 B2 | 8/2005 | Bell et al. |
| 6,929,617 B2 | 8/2005 | McCormick et al. |
| 6,931,875 B1 | 8/2005 | Allen et al. |
| 6,936,018 B2 | 8/2005 | Chalek |
| 6,952,250 B2 | 10/2005 | Ueda |
| 6,953,982 B1 | 10/2005 | Tai et al. |
| 6,969,378 B1 | 11/2005 | Vukos et al. |
| 7,018,368 B2 | 3/2006 | VanGompel et al. |
| 7,056,411 B2 | 6/2006 | Desai et al. |
| 7,223,818 B2 | 5/2007 | Autran et al. |
| 7,273,476 B2 | 9/2007 | Mueller et al. |
| 7,458,961 B2 | 12/2008 | Carstens |
| 7,462,173 B2 | 12/2008 | Carstens |
| 7,481,801 B2 | 1/2009 | Carstens |
| 7,537,587 B2 | 5/2009 | Carstens |
| 7,614,399 B2 | 11/2009 | Carstens |
| 7,785,311 B2 | 8/2010 | Carstens |
| 7,789,867 B2 | 9/2010 | Carstens |
| 7,803,147 B2 | 9/2010 | Carstens |
| 7,846,145 B2 | 12/2010 | Carstens |
| 7,867,211 B2 | 1/2011 | Carstens |
| 2001/0025140 A1 | 9/2001 | Torok et al. |
| 2002/0023284 A1* | 2/2002 | Romano ............... 2/16 |
| 2004/0031830 A1* | 2/2004 | Davis ............ 224/222 |
| 2004/0094592 A1 | 5/2004 | Brown |
| 2004/0127881 A1 | 7/2004 | Stevens et al. |
| 2004/0193133 A1 | 9/2004 | Desai et al. |
| 2004/0210287 A1 | 10/2004 | Greene |
| 2005/0049661 A1 | 3/2005 | Koffroth |
| 2005/0090795 A1 | 4/2005 | Coleman |
| 2005/0193476 A1* | 9/2005 | Chinn ............... 2/247 |
| 2005/0255898 A1 | 11/2005 | Huang |
| 2005/0256489 A1 | 11/2005 | Sawyer et al. |
| 2006/0004341 A1 | 1/2006 | Olson et al. |
| 2006/0004342 A1 | 1/2006 | Sawyer et al. |
| 2006/0010578 A1* | 1/2006 | Kane ................ 2/311 |
| 2006/0069319 A1 | 3/2006 | Elhag et al. |
| 2006/0117458 A1* | 6/2006 | Ishihara et al. ......... 2/170 |
| 2006/0253093 A1 | 11/2006 | Beck et al. |
| 2006/0264865 A1 | 11/2006 | Carstens |
| 2006/0264867 A1 | 11/2006 | Carstens |
| 2006/0264868 A1 | 11/2006 | Carstens |
| 2006/0264869 A1 | 11/2006 | Carstens |
| 2006/0264870 A1 | 11/2006 | Carstens |
| 2006/0264871 A1 | 11/2006 | Carstens |
| 2006/0264872 A1 | 11/2006 | Carstens |
| 2006/0264873 A1 | 11/2006 | Carstens |
| 2006/0264874 A1 | 11/2006 | Carstens |
| 2006/0264877 A1 | 11/2006 | Carstens |
| 2006/0264878 A1 | 11/2006 | Carstens |
| 2006/0264879 A1 | 11/2006 | Carstens |
| 2006/0264880 A1 | 11/2006 | Carstens |
| 2006/0264881 A1 | 11/2006 | Carstens |
| 2006/0264882 A1 | 11/2006 | Carstens |
| 2006/0264883 A1 | 11/2006 | Carstens |
| 2006/0264884 A1 | 11/2006 | Carstens |
| 2006/0264885 A1 | 11/2006 | Carstens |
| 2007/0093771 A1 | 4/2007 | Arizti et al. |
| 2007/0102461 A1 | 5/2007 | Carstens |
| 2007/0106237 A1 | 5/2007 | Carstens |
| 2007/0106350 A1 | 5/2007 | Carstens |
| 2007/0106352 A1 | 5/2007 | Carstens |
| 2007/0106353 A1 | 5/2007 | Carstens |
| 2007/0106354 A1 | 5/2007 | Carstens |
| 2007/0106355 A1 | 5/2007 | Carstens |
| 2007/0106356 A1 | 5/2007 | Carstens |
| 2007/0139875 A1 | 6/2007 | Carstens |
| 2007/0142816 A1 | 6/2007 | Carstens |
| 2007/0287348 A1 | 12/2007 | Autran et al. |
| 2007/0299489 A1 | 12/2007 | Francis et al. |
| 2008/0119815 A1 | 5/2008 | Carstens |
| 2009/0030392 A1 | 1/2009 | Kanai et al. |
| 2010/0094240 A9 | 4/2010 | Desai et al. |
| 2010/0324522 A1 | 12/2010 | Carstens |
| 2010/0324525 A1 | 12/2010 | Carstens |
| 2010/0324526 A1 | 12/2010 | Carstens |
| 2011/0092945 A1 | 4/2011 | Carstens |

OTHER PUBLICATIONS

Labels on package for product: Therma Care™ Heatwraps (Knee), Procter & Gamble, marketed prior to Nov. 2004.
Labels on package for product: Therma Care™ Heatwraps (Menstrual Patches), Procter. & Gamble, marketed prior to Nov. 2004.
Labels on package for product: Therma Care™ Heatwraps (Neck to Arm), Procter & Gamble, marketed prior to Nov. 2004.
Labels on package for product: Walgreens HeatWraps (Back/Hip), Dist. By Walgreen Company, marketed prior to Nov. 2005.
Labels on package for product: Universal Plus Hot & Cold Compress (Reusable), Bar Code/SKU 7-75965-22100-4, Medi-Temp, LLC, marketed prior to Nov. 2005.
Labels on package for product: Polar-Preene™ I.C.E./Heat (Adjustable/Reusable) (Back/Shoulder Wrap), Bar Code/SKU 3-8290-486909-0, BD Consumer Healthcare, marketed prior to Nov. 2005.
Labels on package for product: HeatWraps, Lot: 407092, Dist. By Perrigo, marketed prior to Nov. 2005.
Labels on package for product: IcyHot® Medicated Sleeve (ankle, elbow, wrist & knee), Bar Code/SKU 0-41167-08304-8, Dist. By Chattem, Inc., marketed prior to Nov. 2004.
Labels on package for product: Well Patch™ Heat Warming Pads (back), Bar Code/SKU 3-10742-09850-1, Dist. By The Mentholatum Co., Inc., marketed prior to Nov. 2005.
Labels on package for product: Grabber® Mycoal™ Heat Treat® Body Warmer, Dist. by Grabber, marketed prior to Nov. 2005.
U.S. Appl. No. 11/135,013, filed May 23, 2005, Carstens.
U.S. Appl. No. 11/135,034, filed May 23, 2005, Carstens.
U.S. Appl. No. 11/135,016, filed May 23, 2005, Carstens.
U.S. Appl. No. 11/135,019, filed May 23, 2005, Carstens.
U.S. Appl. No. 11/135,020, filed May 23, 2005, Carstens.
U.S. Appl. No. 11/135,015, filed May 23, 2005, Carstens.
U.S. Appl. No. 11/135,024, filed May 23, 2005, Carstens.
U.S. Appl. No. 11/135,025, filed May 23, 2005, Carstens.

U.S. Appl. No. 11/135,026, filed May 23, 2005, Carstens.
U.S. Appl. No. 11/135,027, filed May 23, 2005, Carstens.
U.S. Appl. No. 11/135,031, filed May 23, 2005, Carstens.
U.S. Appl. No. 11/135,014, filed May 23, 2005, Carstens.
U.S. Appl. No. 11/135,023, filed May 23, 2005, Carstens.
U.S. Appl. No. 11/135,033, filed May 23, 2005, Carstens.
U.S. Appl. No. 11/135,021, filed May 23, 2005, Carstens.
U.S. Appl. No. 11/135,022, filed May 23, 2005, Carstens.
U.S. Appl. No. 11/135,030, filed May 23, 2005, Carstens.
U.S. Appl. No. 11/135,029, filed May 23, 2005, Carstens
U.S. Appl. No. 11/135,017, filed May 23, 2005, Carstens.
U.S. Appl. No. 11/135,028, filed May 23, 2005, Carstens.
U.S. Appl. No. 11/135,018, filed May 23, 2005, Carstens.
U.S. Appl. No. 11/135,032, filed May 23, 2005, Carstens.

U.S. Appl. No. 11/311,773, filed Dec. 19, 2005, Carstens.
U.S. Appl. No. 11/269,267, filed Nov. 8, 2005, Carstens.
U.S. Appl. No. 11/269,268, filed Nov. 8, 2005, Carstens
U.S. Appl. No. 11/269,269, filed Nov. 8, 2005, Carstens.
U.S. Appl. No. 11/269,270, filed Nov. 8, 2005, Carstens.
U.S. Appl. No. 11/269,254, filed Nov. 8, 2005, Carstens.
U.S. Appl. No. 11/269,255, filed Nov. 8, 2005, Carstens.
U.S. Appl. No. 11/269,256, filed Nov. 8, 2005, Carstens.
U.S. Appl. No. 11/269,252, filed Nov. 8, 2005, Carstens.
U.S. Appl. No. 11/269,253, filed Nov. 8, 2005, Carstens.
U.S. Appl. No. 11/269,266, filed Nov. 8, 2005, Carstens.
U.S. Appl. No. 11/311,774, filed Dec. 19, 2005, Carstens.

* cited by examiner

BODY CONFORMING TEXTILE HOLDER FOR ELECTRONIC DEVICE

FIELD OF THE INVENTION

The present invention relates to a body conforming, reusable, washable, textile holder for removably holding at least one electronic device in close bodily contact. More particularly, the invention relates to a reusable wrap or tube holder constructed to enclose a portion of the body where the electronic device is to be held. The electronic device may be a cellular telephone, a wireless communication device, a personal audio device, a wearable computer, an electronic monitoring device, an electronic identification card, or other electronic device. The invention also relates to a system comprising the body conforming holder and an electronic device for use therewith, and a method for holding such an electronic device in close bodily contact by wearing the holder.

BACKGROUND OF THE INVENTION

In an environment of rapid electronic innovation, personal electronic devices are becoming more numerous and much smaller. As a result, a good deal of attention is now being focused on technology-enabled clothing, wearable personal computers, and garments designed for holding electronic devices. Wearable computer systems have previously comprised bulky electronic components that are often held by heavy duty belts, vests, etc., such as described in U.S. Pat. No. 6,137,675. With continued development of miniature integrated circuits, wireless two-way links, flexible circuits, and the like, wearable computers are becoming more practical, and the corresponding holders can be designed to be much more convenient, comfortable, and discreet. Additionally, the recent proliferation of personal electronic devices, including cellular telephones, MP3s, PDAs, electronic identification cards, GPS devices, etc., has created a need for holders that provide a hands-free way to carry multiple electronic devices. Holders addressing this need typically are loose fitting jackets or vests with specially designed pockets, or bulky belts and wraps.

Thus, there is a continuing need for more convenient, comfortable, and discreet holders for securely holding electronic devices in close bodily contact where they are readily accessible.

SUMMARY OF THE INVENTION

The present invention relates to an electronic device holding system comprising a body conforming, reusable, washable, textile holder for removably holding at least one electronic device in close bodily contact, said holder being a wrap or tube constructed to enclose a portion of the body, and comprising an elastic region having a Holding Force (HF-4.0) of greater than about 0.1 kgf; and a Holding Force (HF-2.5) of less than about 1.0 kgf and at least one electronic device capable of being removably held in close bodily contact by said holder.

The invention also relates to an electronic device holding system comprising a body conforming, shirt-like, reusable, washable, textile holder for removably holding at least one electronic device in close bodily contact, said holder being constructed to enclose a portion of the body, and comprising an elastic region having a Holding Force (HF-4.0) of greater than about 0.1 kgf and a Holding Force (HF-2.5) of less than about 1.0 kgf; and at least one electronic device capable of being removably held in close bodily contact by said holder.

In another aspect, the invention relates to a an electronic device holding system comprising a body conforming, reusable, washable, textile holder for removably holding at least one electronic device in close bodily contact in a selected location, said holder comprising at least one pocket for receiving and supporting the electronic device, and said holder being a wrap or tube constructed to enclose a portion of the body, and comprising an elastic region having a Holding Force (HF-4.0) of greater than about 0.1 kgf and a Holding Force (HF-2.5) of less than about 1.0 kgf; and at least one electronic device capable of being removably held in close bodily contact by said holder.

DETAILED DESCRIPTION OF THE INVENTION

Figure 1:
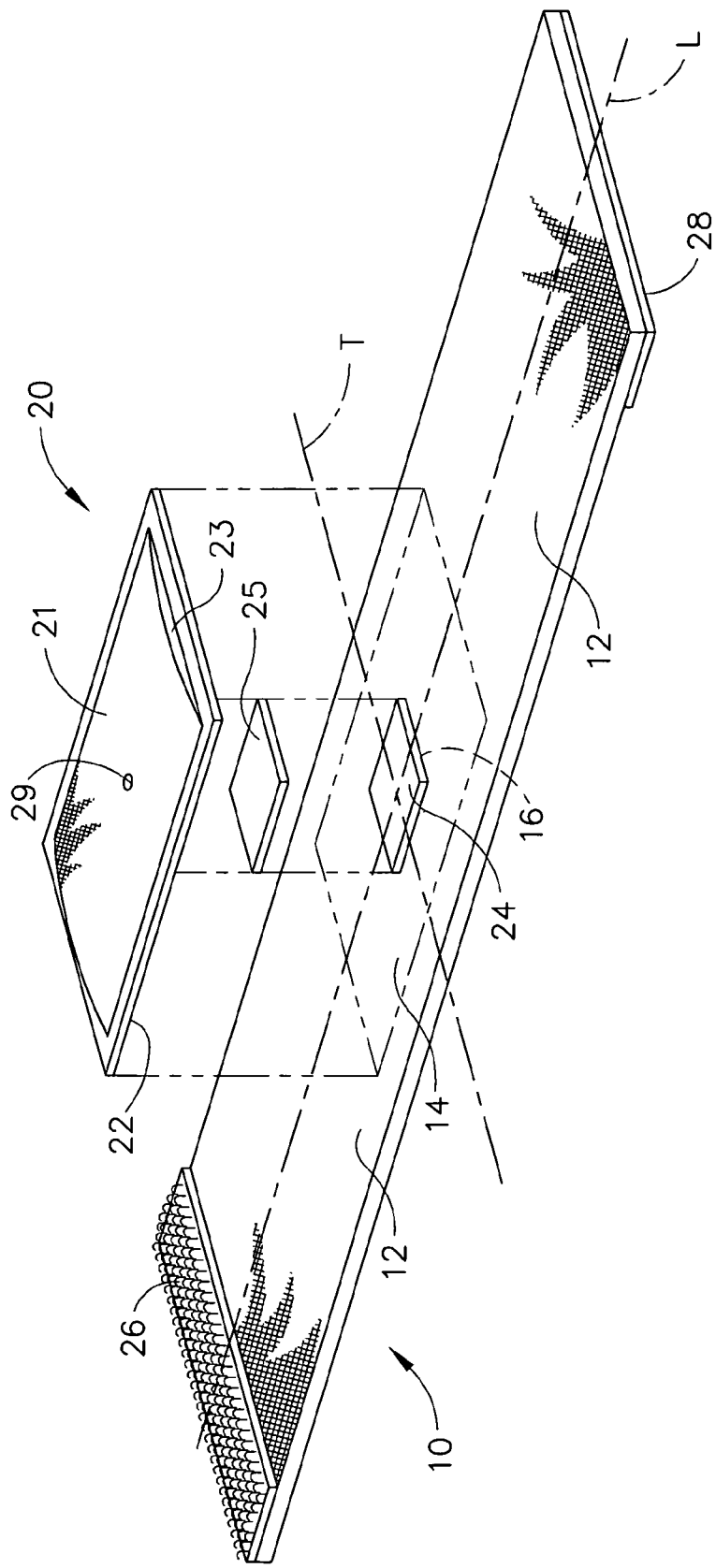
FIG. 1 is a perspective view of a holder and system of the invention comprising a body conforming textile wrap holder and an electronic device capable of being removably held in close bodily contact by the holder.

The reusable, washable, textile holder of the invention is suitable for removably holding one or more coordinated electronic devices in close bodily contact in a desired position or location on the body of a user. In one embodiment, the body conforming holder removably holds one or more personal audio devices in close bodily contact against an area of the user's body for improved listening pleasure, holding convenience, and the like. The reusable holders and replaceable electronic devices herein are coordinated so as to have compatible shapes, sizes, and flexibility in order to fit reliably and comfortably against the body region of the wearer.

While not intending to be limited by theory, it is believed that the elastic properties of the textile holder provide sufficient holding force to hold the electronic device (e.g., a cellular telephone) in close bodily contact throughout a range of wearer motions. This sufficient, comfortable and reliable holding force often results in improved holding convenience and/or other performance benefits (e.g., better monitoring of body parameters, such as heart beat, blood pressure, etc.). Additionally, when the reusable holder and removable electronic device are designed and coordinated to work together, the resulting system can be optimized to provide consumer benefits such as improved wearing comfort, discreetness under clothing, and/or better stay-in-place performance.

The invention thus also relates to a system comprising a reusable, body conforming holder and at least one coordinated electronic device for use therewith, and a method for holding such an electronic device in close bodily contact in a region by wearing the holder. The electronic device has a size and shape compatible with the holder, and is capable of being held in close bodily contact in the desired body region by the holder. Typically, the electronic device and the holder are designed and coordinated to work together. As a result, the system may provide improved convenience, performance, wearing comfort, and/or discreetness. The electronic device and holder of this system may be packaged in a common, bundled, coordinated, or associated package or packages, and may be sold as a kit. The electronic devices may also be sold separately from the holder. Typically, replacement electronic devices would be sold separately from the holder, with or without instructions for use with the holder.

As used herein, the term "electronic device" refers to any suitable electronic device known by those skilled in the art, and combinations thereof, that may be held in close bodily contact by the holder. An electronic devise may be a cellular telephone, a wireless communication device, a personal audio system, an electronic identification card, an electronic watch, a Global Positioning System (GPS) device, an electronic heating device, a two-way wireless link system, an integrated circuit, and the like. An electronic device herein may also be a wearable personal computer system comprising one electronic component or a series of components and/or computer modules, connected by wires or wireless link systems. An electronic device may also be a body function monitor intended to monitor various body function parameters. In one embodiment, the electronic device is flexible so as to conform to body contours.

The term "reusable" refers to articles, such as the holders herein, intended to be reused. The articles may be cleaned, laundered or otherwise restored and/or reused after use.

The reusable holder/electronic device system of the present invention may comprise one or more devices mounted to the holder at the same time. However, for clarity, a holder/device system comprising a single electronic device is often described herein.

The holder of this invention is comfortable to wear notwithstanding the close conformity of the holder and electronic device to the wearer's body. It is believed that the sufficient and comfortable holding force provided by the holder is due at least in part to the force exerted by the elastic material used in the holder. The holder can be characterized as comprising an elastic region, and often more than one elastic region, with a moderate to low Holding Force (HF) value at a given extension distance, when measured as described herein, and a relatively high available stretch as worn. In contrast, previous holders have often attempted to hold an electronic device to a body area by using materials of relatively high stretch modulus that either hold the device using a tight overall fit or are designed to fit loosely. Such high modulus holders are often characterized as having high contractive forces, relatively low available stretch, and stretch properties in only one direction. Holders of these types generally have high Holding Force values at a given extension distance, and are often described as uncomfortable or unable to maintain the electronic device in close bodily contact, especially with body motion.

The elastic region of the holder herein cooperates with other regions so that the holder as worn provides a comfortable but sufficient holding force to hold the device against the body. Without being bound by theory, it is believed that the holding force provided by the holder is due at least in part to the compressive holding force provided by the stretch material in the holder. When the holder is stretched in use, the material exerts compressive forces to hold the electronic device closely against the wearer's body. This conformity is maintained over a wide range of body movement. The holding force is great enough to hold the electronic device in close bodily contact, but generally is not great enough to cause wearer discomfort. Material of the elastic region typically has moderate to low stretch modulus and provides relatively high available stretch as worn. This high available stretch, typically in both the lateral and longitudinal directions, combined with sufficient but relatively low holding force, helps to maintain the electronic device in close bodily contact across a range of body sizes, device sizes, and body motions. In one embodiment, the holder comprises an elastic region having a Holding Force (HF-4.0) of greater than about 0.05 kgf, typically greater than about 0.1 kgf, as measured by the Holding Force method presented herein. In another embodiment, the holder comprises an elastic region having a Holding Force (HF-4.0) of greater than about 0.2 kgf, typically greater than about 0.3 kgf. The elastic region typically also has a Holding Force (HF-1.0) of less than about 1.0 kgf. The elastic region typically has a Holding Force (HF-2.0) of less than about 1.0 kgf, and typically has a Holding Force (HF-3.0) of less than about 1.0 kgf. In one embodiment, the holder comprises an elastic region having a Holding Force (HF-4.0) of less than about 1.0 kgf, and typically having a Holding Force (HF-5.0) of less than about 1.0 kgf, more typically less than about 0.8 kgf. In another embodiment, the holder comprises an elastic region having a Holding Force (HF-5.5) of less than about 1.0 kgf, more typically less than about 0.8 kgf.

The elastic region of the holder can comprise any woven material, knit material, nonwoven material (with stretch incorporated as known in the art), or the like that possesses the requisite physical properties. Similarly, the holder can comprise one material or a combination of materials, stitching, and/or design patterns that collectively possess the requisite physical properties. The elastic region can be cut to an appropriate shape and size, and joined to the remaining portions of the holder. In one embodiment, the elastic region of the holder is wholly plain knit, typically jersey knit, from a combination of elastically extensible and non-elastically extensible yarns. The elastic properties of the individual yarns and the particular knitting pattern can be used to define the mechanical properties of the holder. The holder typically comprises knit material and elastomeric fiber material. In one embodiment, the holder comprises wholly plain knit, e.g., jersey knit, using elastomeric fiber material such as Lycra® or spandex yarn having suitable mechanical properties in all courses. Other knitting patterns and alternative yarns can be used to provide the desired mechanical properties. Suitable yarns include natural yarns, such as cotton yarns and wool yarns, and synthetic yarns, such as nylon yarns, polyester yarns, acrylic yarns, and combinations thereof, e.g., nylon yarns and cotton yarns. Typically, elastomeric fiber material such as Lycra® or spandex yarns are used with these natural and/or synthetic fibers to provide the desired stretch properties. In one embodiment, the elastic region of the holder comprises from about 5% to about 30%, typically from about 10% to about 25%, more typically from about 15% to about 20%, of the elastomeric fiber material, e.g., Lycra®. For example, the elastic region of the holder may comprise from about 80% to about 85% nylon yarn and from about 15% to about 20% of Lycra®.

While the device attachment region of the holder need not comprise an elastic material, it is typically extensible in both the longitudinal and lateral directions. Such elastic extensibility enables the holder to fit a variety of bodily shapes and sizes and provides good conformity to a wearer's body. The mounting region and electronic device attachment region cooperate with the elastic region of the holder to provide sufficient holding force to hold the device in close bodily contact throughout a range of wearer movements. Such a force helps maintain the device worn with the holder in close bodily contact. In one embodiment, the elastic region(s), mounting region(s), and the device attachment region(s) of the holder are made of the same material, typically a knit material as described above. The holder may comprise at least one additional extension, panel, or other structure extending beyond or attached to the above regions so long as it does not significantly interfere with the function of the holder.

While the present invention encompasses a wide variety of holder designs to fit various regions of the body with coordinated electronic devices, it will often be described in terms of a holder comprising a material of relatively high stretch and moderate to low stretch modulus, used in conjunction with an electronic device such as a cellular telephone, a wireless communication device, a personal audio device, a wearable computer, an electronic monitoring device, an electronic identification card, or other electronic device. FIG. 1 shows a perspective view of such a holder 10 of the invention in the form of a wrap in a full flat out position. The holder comprises elastic regions 12, a mounting region 14, and a device attachment region 16. In one embodiment, elastic regions 12 are elastic in both the lateral and longitudinal directions.

The holder 10 has a longitudinal centerline L and a lateral centerline T. The term "longitudinal" refers to a line, axis or direction in the plane of the holder that is generally elongated to accommodate fit around a body region. The term "lateral" refers to a line, axis or direction that lies within the plane of the holder that is generally perpendicular to the longitudinal direction. The elastic regions 12 are formed from a material of relatively high stretch and moderate to low stretch modulus. Such a wrap holder design could be worn around the waist region of a user to conveniently, comfortable, and effectively hold one or more electronic devices, such as components of a wearable computer, a personal audio system, or wireless communication device.

The holder 10 can comprise woven fabrics, knit fabrics, or special nonwoven fabrics (with stretch incorporated as known in the art), but typically comprises a knit fabric. Other materials having the requisite mechanical properties are also suitable. The holder is designed to be reusable, but typically is disposed of after a period of time (e.g., about 6 to 12 months depending on the amount of use) when it begins to lose elasticity or otherwise shows wear. When the holder is a knit fabric, the mechanical properties of the various components can be provided by a combination of the knit pattern used for a particular component and the yarns that are used. In one embodiment, the stretch properties of the elastic regions 12 of the holder are derived from knit materials known in the art. In one example, the elastic regions 12, mounting region 14, and device attachment region 16 are wholly knit. The holder typically comprises material having a basis weight similar to conventional undergarments in order to provide a desired "sheerness". This relatively low basis weight and sheerness facilitates wearing this system comfortably and discreetly under outer garments.

The holder 10 is constructed to be reused and incorporates one or more areas, such as mounting region 14, to which a replaceable device herein can be removably mounted. The holder can be used with a wide variety of removable and replaceable electronic devices, including a cellular telephone, a wireless communication device, a personal audio device, a wearable computer, an electronic monitoring device, an electronic identification card, or other electronic device. In FIG. 1, device 20 comprises a body facing side 21 and a side 22 opposite the body facing side. Electronic device 20 is removably mounted to holder 10 by employing a hook and loop fastening system. In this embodiment, loop fastener portion 24 is securely affixed to a surface of holder 10, e.g., by gluing it to the surface of the holder. Alternatively, the loop fastener portion can be an integral part of the holder. For example, the holder or a portion thereof may be made of a material that can function as the loop fastener portion, such as a knit material. Hook fastener portion 25 is securely affixed to device 20, e.g., by gluing it to the device. When the wearer decides to change the electronic device 20, a new device comprising a hook fastener portion can be mounted to holder 10, thereby securely affixing the device in the desired position on the holder.

Holder 10 comprises fastening means to enable it to be affixed to a desired location on the user's body in a manner that allows device 20 to overlie the desired body area. While various fastening means can be used, FIG. 1 depicts the use of a conventional hook and loop fastening system comprising hook fastening portion 26 and loop fastening portion 28. In this embodiment, hook fastener portion 26 is mounted along an edge of holder 10, typically on the same surface to which loop fastener portion 24 is mounted. Loop fastener portion 28 is affixed to holder 10 on the opposed surface thereof. By employing this construction, holder 10 can be easily and securely mounted to virtually any desired location on the body of the user.

Once electronic device 20 is mounted to holder 10 in the desired position, the device is placed in contact with the body. Holder 10 can then be wrapped around that portion of the body, with the end of the holder bearing fastener portion 26 being wrapped around the body portion as the final step. The system is secured to the body by bringing the surface of fastener portion 26 into contact with the exposed surface of fastener portion 28, enabling the hook and loop fastening members to engage. The system is thus securely affixed to the body of the user with electronic device 20 overlying the desired body area. As will be apparent to one of ordinary skill in this art, while the components depicted in FIG. 1 are presented as simple rectangular shapes, the system can be constructed in any desired width or length or in any desired shape or configuration in order to be securely mounted to the desired body location.

Figure 2:
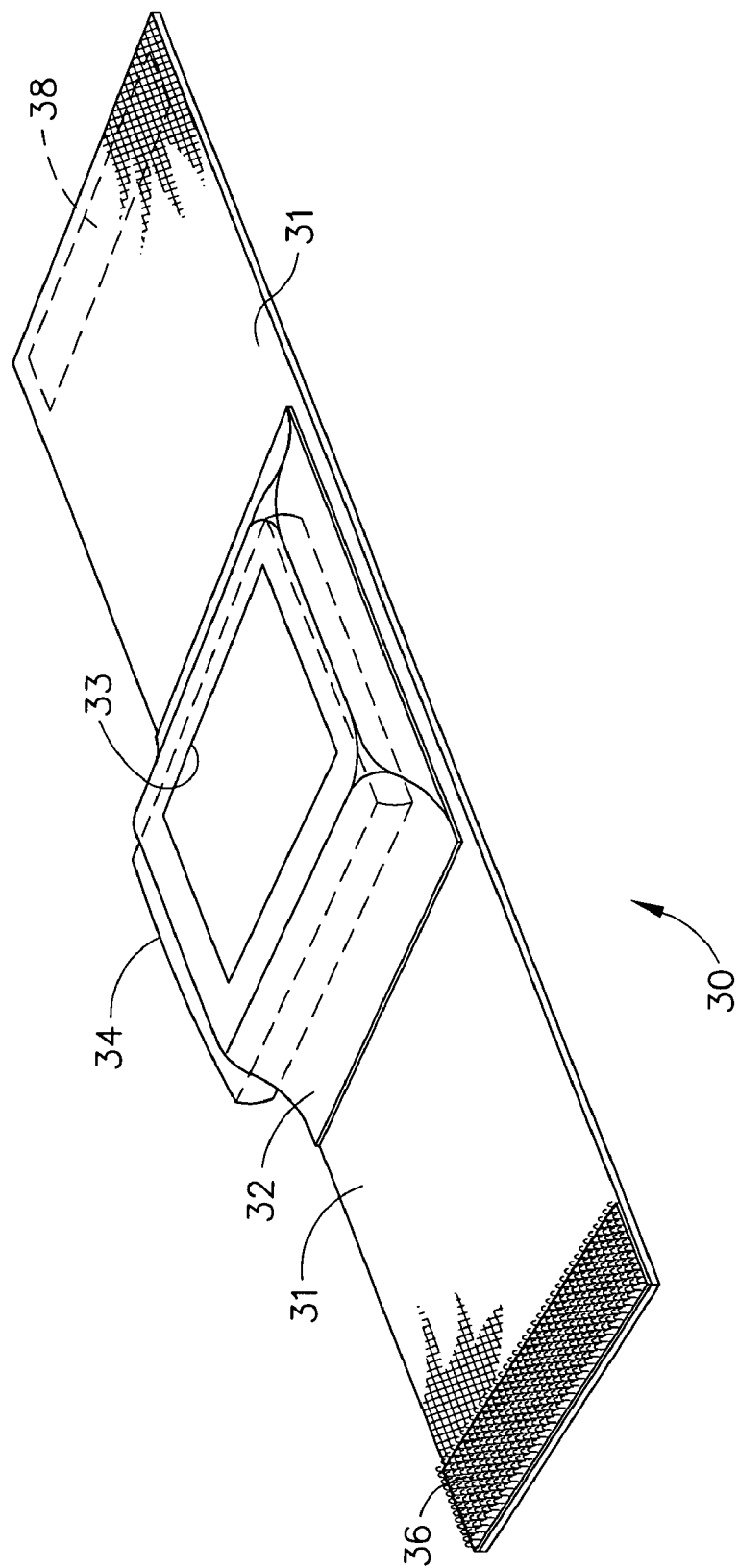
FIG. 2 is a perspective view of another holder and system of the invention comprising a body conforming textile wrap holder and an electronic device capable of being removably held in close bodily contact by the holder.

FIG. 2 shows another method for mounting a replaceable electronic device to a holder of the invention. In this embodiment, holder 30 is in the form of a wrap in a full flat out position. Holder 30 comprises elastic regions 31 and a pocket 32 affixed to the holder for receiving and removably mounting electronic device 34. The pocket may be integrally formed in the holder, or it may be separately attached to the holder, e.g., by sewing, gluing or using mechanical fasteners. The pocket may have an opening, such as opening 33, or it may be made of mesh material to allow direct or substantial contact between the electronic device and the body. Alternatively, the pocket may be on the outside of the holder (the side opposite that shown in FIG. 2), and the pocket and/or the holder may have an opening therein so that the device is in direct or substantial contact with the body. Electronic device 34 may be secured within the pocket by the addition of a mechanical or adhesive fastening system, but typically is retained by holder 30 in the pocket simply as a result of contractive forces and friction. Alternatively, the device may be affixed to the holder by employing a mechanical or adhesive fastening system. In the embodiment shown, holder 30 also comprises hook and loop fasteners 36 and 38 affixed to opposed surfaces of the holder that can be positioned to removably enclose a portion of the body. The holder can be secured to the body in a manner similar to that described above regarding FIG. 1.

In one embodiment, electronic device 34 in FIG. 2 is a wireless communication device such as a cellular telephone. Such telephones may use any technology or protocols known in the art, and may be available in various sizes and constructions. Cellular telephones typically comprise multiple components, including a keypad, a display, wireless telephone circuitry (e.g., transceiver), a battery, a speaker, and a microphone, all contained within a protective housing unit. However, other component configurations, including configurations that physically separate one or more of these components and use wired or wireless links to connect the components, may be used with body conforming holders of this invention. Such multiple component communication devices are disclosed in U.S. Pat. Nos. 6,272,359 and 5,721,783, both incorporated herein by reference.

In another embodiment, electronic device 34 in FIG. 2 is a personal audio device, such as a CD player, MP3 player, or portable radio. These devices may be held close to the wearer's ear, or elsewhere on the body, using a wired or wireless link to an earpiece worn in or around the ear. Such an audio device configuration is disclosed in U.S. Pat. No. 6,594,370, incorporated herein by reference.

In another embodiment, electronic device 34 in FIG. 2 is a modular component of a multiple component wearable personal computer. One such modular computer system is described in U.S. Pat. No. 5,555,490, incorporated herein by reference. In that embodiment, the modular microcomputer system has a plurality of microcomputer cards housed in a plurality of microcomputer card pockets of the holder. Components of the computer system can be linked by flexible circuitry and card connectors. Such wearable computer systems are enhanced when used with the more comfortable and discreet body conforming holders of this invention.

Figure 3:
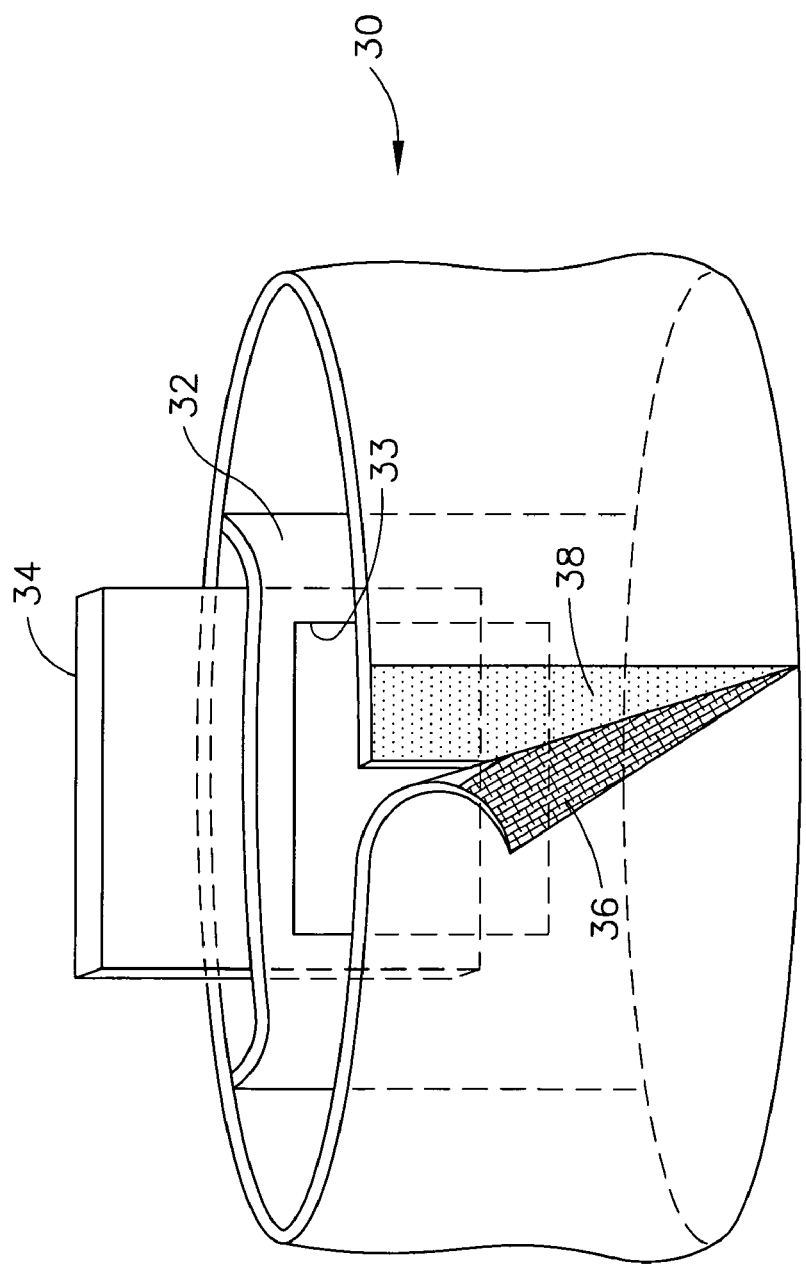
FIG. 3 is a perspective view of the holder and electronic device shown in FIG. 2 with fastening materials partially engaged to close the holder.

FIG. 3 is a perspective view of the holder 30 and electronic device 34 shown in FIG. 2, with hook and loop fasteners 36 and 38 partially engaged to close the holder, such as when it is placed around a portion of the body and removably encloses it. Electronic device 34 is shown only partially inserted in pocket 32, but typically would by fully inserted into the pocket before the holder is closed around a portion of the body.

Figure 4:
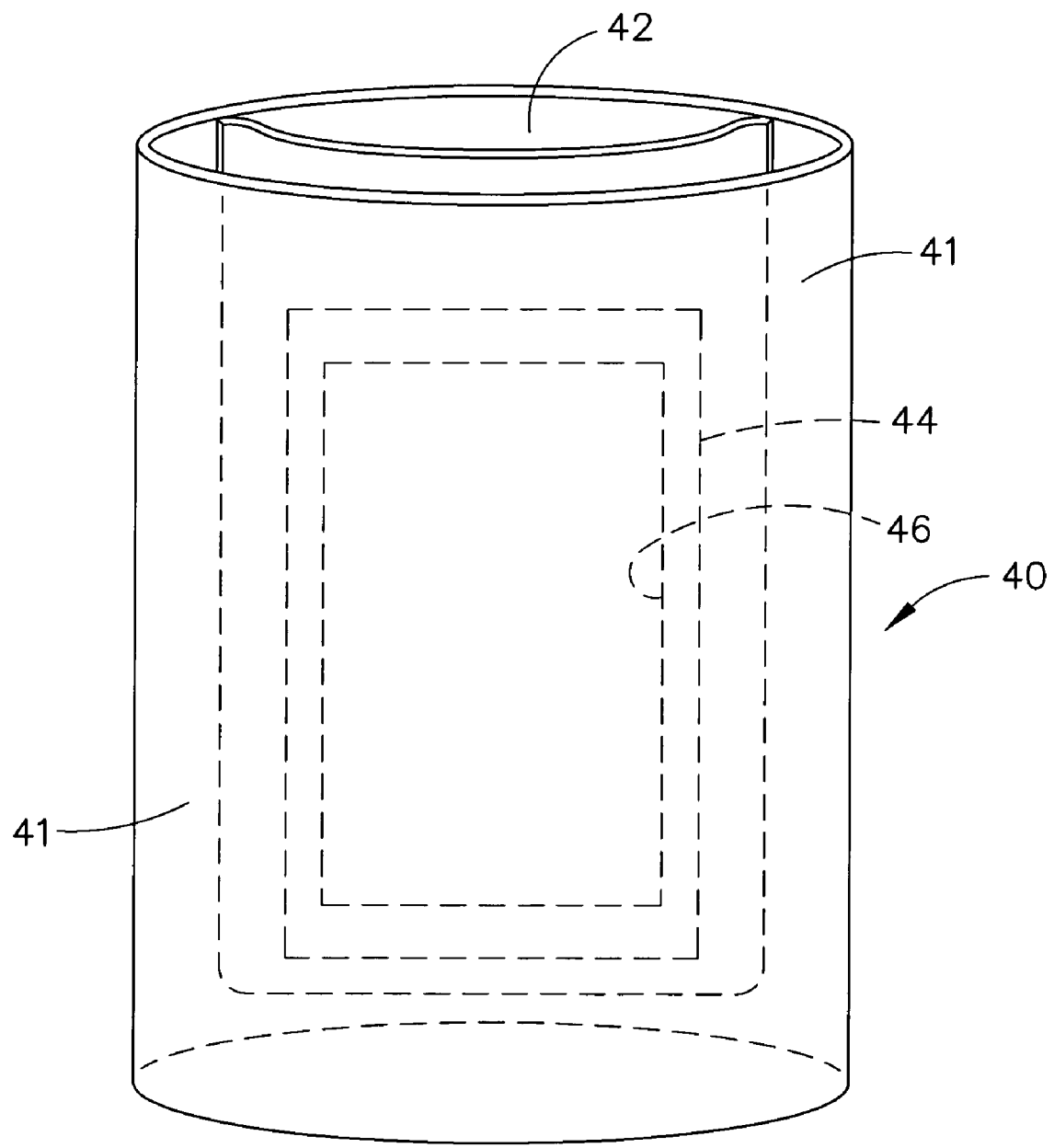
FIG. 4 is a perspective view of a holder and system of the invention comprising a body conforming textile tube holder and an electronic device capable of being removably held in close bodily contact by the holder.

FIG. 4 illustrates another holder 40 of the invention constructed in the form of a tube that can be positioned to enclose a portion of the body. Holder 40 comprises elastic regions 41 and one or more areas to which an electronic device is removably mounted. In this embodiment, electronic device 44 is removably held in close bodily contact by holder 40 by inserting the device into pocket 42. As described above, the pocket may be integrally formed in the holder, or it may be separately attached to the holder, e.g., by sewing, gluing or using mechanical fasteners. The pocket may have an opening, such as opening 46, or it may be made of mesh material to allow direct or substantial contact between the electronic device and the body. Alternatively, the pocket may be on the outside of the holder, and the pocket and/or the holder may have an opening therein so that the device is in direct or substantial contact with the body. Electronic device 44 can be retained by holder 40 in the pocket simply as a result of contractive forces and friction. In another embodiment, a fastening system, such as a hook-and loop fastener or an adhesive fastener, can be employed to removably mount device 44 to holder 40. Holder 40 can be formed from a circular knit elastic material of relatively high stretch and moderate to low stretch modulus. The system can be secured to the body by pulling the tube-shaped holder 40, with electronic device 44 mounted, over the body region (e.g., leg, arm, etc.).

Figure 5:
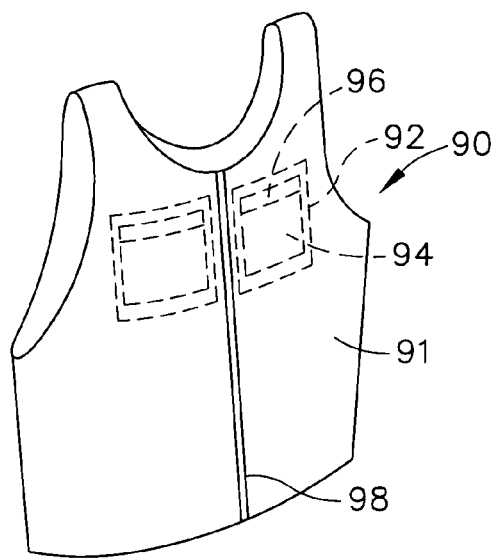
FIG. 5 is a perspective view of a holder and system of the invention comprising a body conforming shirt-like textile holder and at least one electronic device capable of being removably held in close bodily contact by the holder.

FIG. 5 illustrates another holder and system of the invention. In this embodiment, body conforming, shirt-like holder 90 is constructed in the form of a vest comprising at least one elastic region 91. An electronic device herein, such as personal audio device 94, can be removably mounted to holder 90 by employing hook and loop fasteners or one or more pockets, such as pocket 92. The pocket may be integrally formed in the holder, or it may be separately attached to the holder, e.g., by sewing, gluing or using mechanical fasteners. The pocket may have an opening or it may be made of mesh material to allow direct or substantial contact between the electronic device and body. Alternatively, the pocket may be on the outside of the holder, and the pocket and/or the holder may have an opening therein so that the device may be in direct or substantial contact with the portion of the body. Employment of this system involves placing the holder 90, with electronic device 94 removably mounted in pocket 92, on the torso as customary depending on the precise shirt design.

Holder 90 further comprises fastening system 98, which can comprise hook and loop fasteners, buttons, a zipper, etc., to close the holder around the user's torso. In one embodiment, holder 90 is a wrap and fastening system 98 comprises at least two cooperating fastening materials e.g., hook and loop fastening materials, affixed to opposed surfaces of the holder that can be positioned to removably enclose a portion of the body. Alternatively, the holder may be a tube, e.g., a pullover or T-shirt, which can be positioned to enclose a portion of the user's body, such as the torso. A fastening system 96, such as a hook and loop fastener or an alternate fastener, can be employed to retain electronic device 94 in pocket 92.

Figure 6:
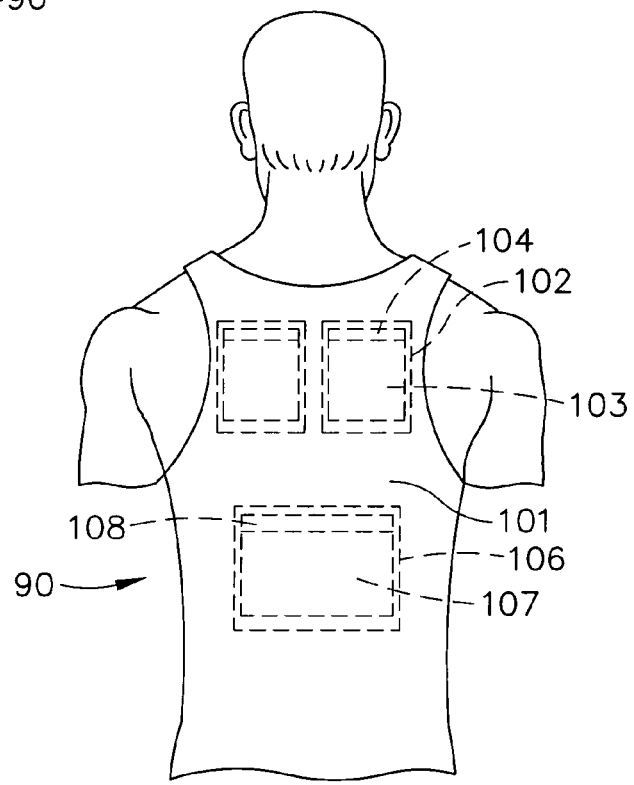
FIG. 6 is a rear view of the holder of FIG. 5 holding at least one additional electronic device in close bodily contact.

FIG. 6 is a rear view of the holder 90 shown holding additional electronic devices 103 and 107, such as multiple components of a wearable personal computer, in close bodily contact. Holder 90 comprises elastic region 101 and pockets 102 and 106. As described above, the pockets may be integrally formed in the holder, or they may be separately attached to the holder, e.g., by sewing, gluing or using mechanical fasteners. The pockets may have an opening or they may be made of mesh material to allow direct or substantial contact between the electronic device and body. Alternatively, the pockets may be on the outside of the holder, and the pockets and/or the holder may have an opening therein so that the electronic device may be in direct or substantial contact with a portion of the body. In this design, electronic devises 103 and 107 are removeably held in close bodily contact by the holder by mounting them in pockets 102 and 106. Fastening systems 104 and 108, such as a hook and loop fastener or an alternate fastener, can be employed to retain the electronic devices in the pockets.

Figure 7:
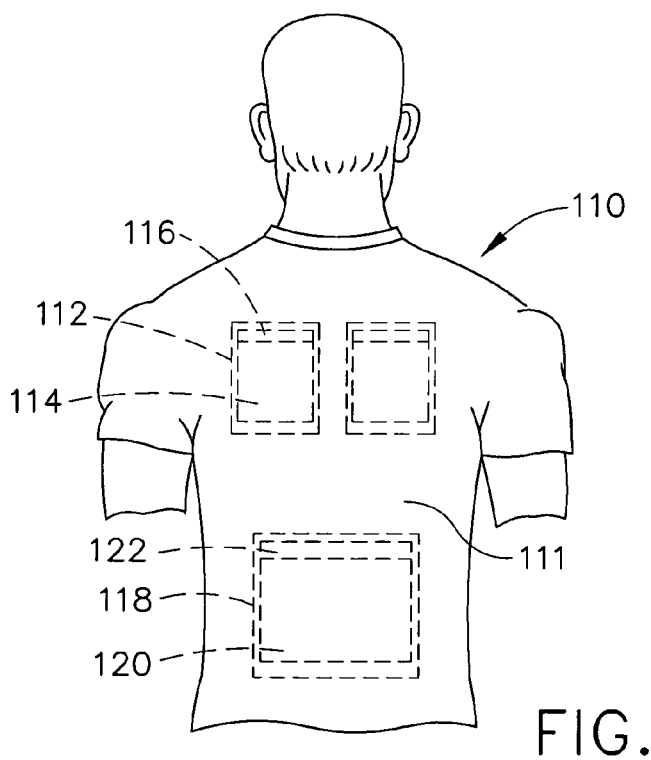
FIG. 7 is a rear view of another holder and system of the invention comprising a body conforming shirt-like textile holder and at least one electronic device capable of being removably held in close bodily contact by the holder.

FIG. 7 is a rear view of another holder and system of the invention. In this embodiment, body conforming shirt-like holder 110 comprises arm extensions, which may be short sleeves as shown or longer sleeves. Holder 110 comprises elastic region 111 and pockets 112 and 118. As described above, the pockets may be integrally formed in the holder, or they may be separately attached to the holder, e.g., by sewing, gluing or using mechanical fasteners. The pockets may have an opening or they may be made of mesh material to allow direct or substantial contact between the electronic device and body. Alternatively, the pockets may be on the outside of the holder, and the pockets and/or the holder may have an opening therein so that the device may be in direct or substantial contact with the portion of the body. Electronic devices 114 and 120 are removably held in close bodily contact by the holder by mounting them in pockets 112 and 118. Fastening systems 116 and 122, such as a hook and loop fastener or an alternate fastener, can be employed to retain the electronic devices in the pockets.

Figure 8:
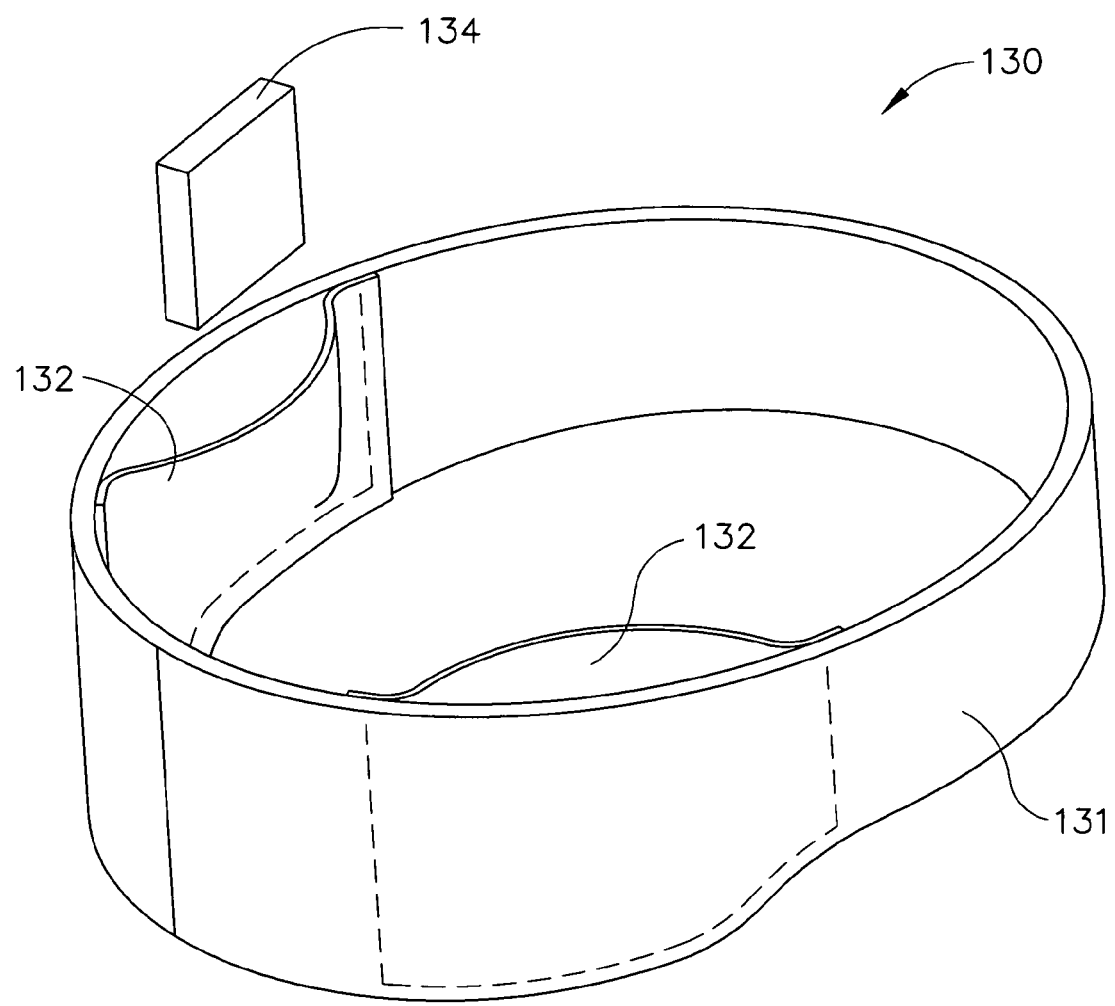
FIG. 8 is a perspective view of another holder and system of the invention comprising a body conforming textile headband holder and an electronic device capable of being removably held in close bodily contact by the holder.

In another embodiment, the invention comprises a body conforming textile holder in the form of headgear, e.g., a hat or headband, and an electronic device capable of being removably held in close bodily contact by the holder. FIG. 8 is a perspective view of one such embodiment comprising a headband holder. In FIG. 8, holder 130 comprises at least one elastic region 131 and at least one pocket 132 for holding electronic device 134. As described above, the pocket may be integrally formed in the holder or it may be separately attached to the holder, e.g., by sewing, gluing or using mechanical fasteners. The pocket may have an opening or it may be made of mesh material to allow direct or substantial contact between the device and the body. Electronic device 134 may be a cellular telephone, a wireless communication device, a personal audio device, an electronic identification card, or other electronic device, as described above. In one embodiment, electronic device 134 is a portable audio device that is removably held in close bodily contact by mounting it in pocket 132 to provide improved audio input to the wearer. Alternatively, the device can be removably mounted to the holder by employing fastening systems such as hook and loop fasteners. For example, the holder can comprise a first fastening material and the device a second fastening material that cooperatively engages the first fastening material and enables the device to be removably affixed to the holder. In one embodiment, the first and second fastening materials comprise mechanical fastening material, e.g., hook and loop fasteners. A suitable holder design in the form of headgear is disclosed in U. S. Pat. No. 5,395,400, incorporated herein by reference.

It will be appreciated that holders herein may have other configurations besides those shown and described. For example, the holder may comprise one or more additional straps, panels, or cut-out areas. Other holder styles, designs, and configurations that comprise at least an elastic region and a device attachment region of suitable properties are within the scope of the invention. As described above, the holder may comprise at least one extension or panel so long as it does not significantly interfere with the holding function of the holder.

Test Method for Measuring the Holding Force (HF) of Materials Using A "Constant-Rate-of-Extension (CRE) Ball Force Test"

Overview: This method measures a force (HF) that is related to the holding force exerted by an extensible material when holding an article against a wearer's body.

Terminology: The Holding Force (HF) is the force exerted by a material when distending it with a force applied at right angles to the plane of the material, under the specified conditions. The angle of application of force and the area of the material upon which the force is applied varies continuously as the material stretches when tested as directed in this method. In the Constant-Rate-of-Extension (CRE) tensile testing machine, the rate of increase of the specimen length is uniform with time.

Summary of Test Method: Set up the tensile testing machine for performing this test in accordance with both the manufacture's instructions and procedures presented herein. A specimen of material is securely clamped without tension within a "Ball Burst Test" attachment. A force is exerted against the specimen by a polished, hardened steel ball attached to the tensile testing machine. Holding Force (HF) data are recorded as a function of extension distance.

Apparatus: Tensile testing machine, of the constant-rate-of-extension (CRE) type. Equipment includes an Imada DPZ High Performance Programmable Digital Force Gauge: Model DPZ-4, and an Imada Motorized Vertical Test Stand: Model MX-110-S Test Stand w/Digital Distance Meter, both available from Imada, Incorporated, Northbrook, Ill. The Force Ball Attachment (modified "Ball Burst Test" attachment) consists of a clamping mechanism to hold the specimen and a steel ball attached to the moveable force gauge of the tensile testing machine. The circular opening and ring clamp has an internal diameter of 5.1 cm (2.0 in). The polished steel ball connected to the force gauge has a diameter of 1.6 cm (0.62 in).

Sampling and Specimen Preparation: The specimen is taken from the elastic region of the holder. Clamp the specimen in the ring clamp of the apparatus. The specimen must be of sufficient diameter to be held securely within the 5.1 cm (2.0 in) diameter ring clamp. The specimen may not require cutting if there is ample room to securely clamp the specimen in the apparatus. Ensure the specimen is free of folds, creases, or wrinkles, and is without tension when clamped. If the specimen is not uniform (e.g., it has a pattern, stitching, or a seam, etc.), ensure that the area tested is representative of the elastic region.

Procedure:

Place the specimen in the ring clamp, without tension, and fasten securely.

Move the Force Ball to a position immediately adjacent the specimen. Make sure there is no force applied to the ball by the specimen (HF-0.0=0 kgf).

Set the distance meter to zero (0 cm elongation).

Start the CRE machine and maintain a speed of 25.4±10 cm/min (10.0±0.5 in/min). Continue that speed until the specimen is extended at least 6.5 cm (2.6 in) or until a force of 2.0 kgf (4.5 lbf) is reached.

While the CRE machine and Force Ball are elongating the specimen, record Holding Force and elongation data at 0.5 second intervals.

Create a standard stress/strain curve (Holding Force versus elongation distance) with the resulting data.

Determine Holding Force (HF) at the appropriate elongation distances.

In the above method:

HF-0.0 is the force at 0 cm specimen elongation, i.e., the start of data collection. HF-0.0 should be 0 kgf at 0 cm elongation.

HF-1.0 is the force (kgf) at 1.0 cm Force Ball extension distance.

HF-2.0 is the force (kgf) at 2.0 cm Force Ball extension distance.

HF-2.5 is the force (kgf) at 2.5 cm Force Ball extension distance.

HF-3.0 is the force (kgf) at 3.0 cm Force Ball extension distance.

HF-4.0 is the force (kgf) at 4.0 cm Force Ball extension distance.

HF-5.0 is the force (kgf) at 5.0 cm Force Ball extension distance.

HF-5.5 is the force (kgf) at 5.5 cm Force Ball extension distance.

All limits and ranges specified herein include all narrower ranges, limits, and amounts that are within the specified limits and ranges, and such narrower ranges and limits may be claimed even though those limits and ranges are not separately listed.

While particular embodiments of the present invention have been illustrated and described, various other changes and modifications can be made without departing from the spirit and scope of the invention. It is therefore intended to cover all such changes and modifications that are within the scope of this invention.

What is claimed is:

1. An electronic device holding system comprising:
    a) a body conforming, reusable, washable, textile holder for removably holding at least one electronic device in close bodily contact, said holder being a wrap or tube constructed to enclose a portion of the body, and comprising an elastic region comprising elastic woven or knit material suitable for use in a reusable, washable holder, said elastic region having a high stretch in both the lateral and longitudinal directions as measured by having a Holding Force (HF−4.0) of greater than about 0.1 kgf and a Holding Force (HF−3.0) of less than about 1.0 kgf; and
    b) at least one electronic device capable of being removably held in close bodily contact by said holder.

2. A system according to claim 1 wherein the holder comprises knit material and elastomeric fiber material.

3. A system according to claim 1 wherein the elastic region of the holder has a Holding Force (HF−4.0) of less than about 1.0 kgf.

4. A system according to claim 1 wherein the elastic region of the holder has a Holding Force (HF−5.0) of less than about 1.0 kgf.

5. A system according to claim 1 wherein the holder is constructed to hold the electronic device in a selected location.

6. A system according to claim 5 wherein the holder comprises at least one pocket for receiving and supporting the electronic device.

7. A system according to claim 1 wherein the holder is headgear.

8. A system according to claim 1 wherein the holder comprises a first fastening material and the electronic device comprises a second fastening material that cooperatively engages the first fastening material and enables the electronic device to be removably affixed to the holder.

9. A system according to claim 8 wherein the first and second fastening materials comprise mechanical fastening material.

10. A system according to claim 1 wherein the holder comprises at least two cooperating fastening materials affixed to opposed surfaces of the holder that can be positioned to removably enclose a portion of the body.

11. A system according to claim 10 wherein the fastening materials comprise mechanical fastening material.

12. A system according to claim 1 wherein the electronic device comprises a cellular telephone, a personal audio device, a body function monitoring device, a personal identification card, a GPS device, a heating device, a wearable computer system, a two-way wireless link system, an integrated circuit, or combinations thereof.

13. A system according to claim 1 wherein the electronic device is flexible so as to conform to body contours.

14. An electronic device holding system comprising:
    a) a body conforming, shirt-like, reusable, washable, textile holder for removably holding at least one electronic device in close bodily contact, said holder being constructed to enclose a portion of the body, and comprising an elastic region comprising elastic woven or knit material suitable for use in a reusable, washable holder, said elastic region having a high stretch in both the lateral and longitudinal directions as measured by having a Holding Force (HF-4.0) of greater than about 0.1 kgf and a Holding Force (HF-3.0) of less than about 1.0 kgf; and
    b) at least one electronic device capable of being removably held in close bodily contact by said holder.

15. A system according to claim 14 wherein the holder comprises knit material and elastomeric fiber material.

16. A system according to claim 14 wherein the elastic region of the holder has a Holding Force (HF-4.0) of less than about 1.0 kgf.

17. A system according to claim 14 wherein the elastic region of the holder has a Holding Force (HF-5.0) of less than about 1.0 kgf.

18. A system according to claim 14 wherein the holder is constructed to hold the electronic device in a selected location.

19. A system according to claim 18 wherein the holder comprises at least one pocket for receiving and supporting the electronic device.

20. A system according to claim 14 wherein the holder comprises at least two cooperating fastening materials affixed to opposed surfaces of the holder that can be positioned to removably enclose the body.

21. A system according to claim 14 wherein the holder has a vest-like design without arm extensions.

22. An electronic device holding system comprising:
    a) a body conforming, reusable, washable, textile holder for removably holding at least one electronic device in close bodily contact in a selected location, said holder comprising at least one pocket for receiving and supporting the electronic device, and said holder being a wrap or tube constructed to enclose a portion of the body, and comprising an elastic region comprising elastic woven or knit material suitable for use in a reusable, washable holder, said elastic region having a high stretch in both the lateral and longitudinal directions as measured by having a Holding Force (HF-4.0) of greater than about 0.1 kgf and a Holding Force (HF-3.0) of less than about 1.0 kgf; and
    b) at least one electronic device capable of being removably held in close bodily contact by said holder.

23. A system according to claim 22 wherein the elastic region of the holder has a Holding Force (HF-4.0) of less than about 1.0 kgf.

24. A system according to claim 22 wherein the elastic region of the holder has a Holding Force (HF-5.0) of less than about 1.0 kgf.

* * * * *